United States Patent
Van Den Brink (10) Patent No.: US 12,421,047 B2
(45) Date of Patent: Sep. 23, 2025

(54) ROLLER CONVEYOR WITH END STOP

(71) Applicant: Moba Group B.V., Barneveld (NL)

(72) Inventor: Hendrik Van Den Brink, Kootwijkerbroek (NL)

(73) Assignee: Moba Group B.V., Barneveld (NL)

( * ) Notice: Subject to any disclaimer, the term of this patent is extended or adjusted under 35 U.S.C. 154(b) by 0 days.

(21) Appl. No.: 18/245,568

(22) PCT Filed: Sep. 10, 2021

(86) PCT No.: PCT/NL2021/050551
§ 371 (c)(1),
(2) Date: Mar. 16, 2023

(87) PCT Pub. No.: WO2022/060219
PCT Pub. Date: Mar. 24, 2022

(65) Prior Publication Data
US 2024/0025648 A1    Jan. 25, 2024

(30) Foreign Application Priority Data

Sep. 16, 2020    (NL) ...................................... 2026481

(51) Int. Cl.
*B65G 13/071* (2006.01)
*B65G 47/51* (2006.01)

(52) U.S. Cl.
CPC ......... *B65G 13/071* (2013.01); *B65G 47/519* (2013.01)

(58) Field of Classification Search
None
See application file for complete search history.

(56) References Cited

U.S. PATENT DOCUMENTS 4,074,805 A    2/1978   Bodewes
4,266,659 A *  5/1981   Meyer .................. B65G 47/261
                                                    198/783

FOREIGN PATENT DOCUMENTS

DE    72 46 322         4/1973
DE    3120412 C2 *      4/1988
(Continued)

OTHER PUBLICATIONS

Translation, DE3120412C2, Accessed from ESPACENET, Jun. 7, 2024 (Year: 1988).*

(Continued)

*Primary Examiner* — William R Harp
(74) *Attorney, Agent, or Firm* — Stephen J. Weyer, Esq.; Stites Harbison, PLLC (57) ABSTRACT

The conveyor system comprises a frame (2) with a substantially plane conveying surface composed by rollers (3) for conveying products (P) in a conveying direction T to an end station with end stop (8);—wherein the frame (2) comprises an edge part with roller shaft slots (5) each with a roller shaft slot lower end, in which roller shafts (4) are displaceably received;—wherein the conveyor system further comprises a beam (6) with a drive belt (7) arranged against the rollers (3) for rotating the rollers (3) to thereby convey the products (P), in particular such that upon a product (P) reaching the end stop (8) or upon a product (P) reaching a preceding arrived product (P) said drive belt (7) slips under the rollers (3) under these arrived products (P); and—wherein the conveyor system is configured such that a maximum pushing force which buffers these products (P) is obtained.

10 Claims, 3 Drawing Sheets

(56) References Cited

FOREIGN PATENT DOCUMENTS

| | | |
|---|---|---|
| FR | 2 561 630 | 9/1985 |
| IT | RE20 100 048 | 12/2011 |
| JP | S55 172209 | 12/1980 |

OTHER PUBLICATIONS

International Search Report for PCT/NL2021/050551 dated Jan. 20, 2022.

* cited by examiner

ROLLER CONVEYOR WITH END STOP

FIELD OF THE INVENTION

The present invention relates to a method for conveying on rotary rollers of a conveyor a row of products in a conveying direction T to an end station where the products reach an end position and are buffered as a row, wherein the products are conveyed on the rotary rollers, wherein at the end position buffering with standstill of the rollers under the buffered products is obtained.

Further, the present invention relates to a conveyor or conveyor system, in a frame with a substantially plane conveying surface composed by rollers, for conveying products in a conveying direction T to an end station with end stop, with a drive belt arranged against the rollers for rotating the rollers to thereby convey the products, for carrying out the above-described method.

BACKGROUND OF THE INVENTION

The above-mentioned method, conveyors, and conveyor systems, are generally known and are for instance used for conveying products to an end station. At this end station, a next processing step will be carried out, for instance the taking up of these products, manually or mechanically with for instance a gripper or a robot, after which further packaging operations can be carried out. More particularly, upon arrival at the end station, in most cases a number of products will be pushed against an end plate, end stop or end bar, to thereby create a group, for instance a row, which can then be picked up. Gathering loose products in this way and forming such a group, sometimes also with high precision in patterns, is also called buffering, that is, the handling prior to further processing, such as for instance the above-mentioned packaging operations.

Where the above-mentioned pushing is concerned, several situations may occur, concurrently or not so. The products, for instance large or small boxes, are pushed against one another while the rollers continue to rotate, slipping under the row formed.

Regularly, it will happen that the products, in a way similar to broken ice, start "drifting", that is, are pushed onto each other, possibly in combination with partial slipping as mentioned above. It will be clear that such drifting with possible damage to the products and energy loss at the drives should be prevented, especially because in the event of drifting the processing step after buffering is typically made impossible. Under the influence of drifting, a most forward (first) product may for instance be pushed over a buffer stop and get damaged, and disturb the buffering process.

Such conveyors are known, for instance from WO2016195497, where the conveyor described is used both for transport, including for instance transport in upward direction to bridge a difference in height, and for buffering. To realize these two functions with rollers that are in principle freely rotating, there are respectively provided, on the one hand, carriers moving up where necessary between the rollers and, on the other hand, a suitable combination of drive belt and roller surface for transporting and buffering in a suitable manner. In particular for the buffering, further, a suitable choice of materials and dimensions is realized to obtain the required combination of friction and driving couple. Further, external or automatic detection, as well as the associated operation of switching elements for the control thereof, will be required to insert or withdraw the carriers during transport or buffering. Moreover, an optimum operation will necessitate a sufficiently long roller system.

Quite a different system is described in NL1013144, namely, a frame with roller conveyor, where a subjacent drive belt drives the rollers with fitted-on rings through friction between the drive belt and the respective fitted-on rings. The axes with fitted-on rings are arranged in a freely rotating manner in recesses in the frame, these recesses enabling displacements of these rollers, horizontally over a certain transport length and vertically because of an inclination.

When, upon buffering, products such as boxes thereupon threaten to be pushed up, the rollers, by means of the fitted-on rings, are to some extent pushed up against the inclination so that the friction is reduced and the rollers at that location under precisely these rollers rotate less. Another system is shown in JP S55-172209. DE7246322U concerns a collecting conveyor, configured for providing an efficient transport capacity, with a directed thrust. To this end, inclined slots are provided to receive conveyor rollers, which slots are open at an upper end. In this manner, the rollers can egress from the upper ends to prevent accidents. Due to the inclination of the slots, a vertical force of the weight of transport products is divided in two directions.

With such systems too, it will eventually not be possible to prevent drifting because the pushing force (in particular a driving force exerted on the rollers) will constantly increase. Also, the rollers rising to some extent will lead to small differences in height between the products and thus make for tilting of the products.

To one skilled in the art it will be clear that a considerable part of the above-outlined problem can be traced back to the friction between the roller surfaces and the products, that is, the bottom surfaces of the products, such as boxes.

More particularly, the problem resides in choosing a coefficient of friction which upon a change of the product to be conveyed, for instance a different type of box of a respective different material, continues to buffer in the desired manner, more particularly with slip as indicated hereinabove. Generally, for the coefficient of friction, values between 0.2 and 0.8 are chosen.

It is to be noted, however, that it holds for many types of products that in the buffering thereof drifting still does occur because the pushing force is not or insufficiently controllable.

SUMMARY OF THE INVENTION

In order to remedy this problem, the present invention provides a method according to the opening paragraph hereof, wherein a maximum pushing force in buffering of the products at the end station is obtained.

With great advantage, with this invention, drifting of the products supplied is avoided, so that further processing thereof such as packaging, as well as damaging of the products, is avoided.

The above-mentioned maximum pushing force (thrust) is, in particular, a maximized pushing force (i.e., the pushing force can, during use, rise from an initial value—for instance with the roller conveyor unloaded—to a limiting value and not exceed that limiting value). The pushing force mentioned is, in particular, a force exerted (by the rollers) on the buffered products, more particularly a total force that is exerted by the rollers on products lying thereon (which force is passed on by the buffered products mutually to a most forward, first product retained by a buffer stop/end stop). In particular, that pushing force will be equal to a slipping force exerted by the—travelling—drive belt on the rollers (when the rollers are at a standstill under the influence of a frictional force exerted by the products on those rollers). This pushing force will increase upon increase of the buffer (i.e., the number of buffered packages). The invention can for instance hinder, or considerably reduce the chances of, a first product of an increasing buffer series of products being pushed over a buffer stop.

According to a further elaboration, the (maximum) pushing force in buffering can be obtained with, or under the influence of, a spring force. Alternatively or additionally, a leverage can be applied.

Further, the present invention provides a conveyor or conveyor system according to the second paragraph hereof, wherein the frame comprises an edge part with roller shaft slots each with a roller shaft slot lower end, the roller shafts being received displaceably in the roller shaft slots, and wherein the conveyor system is configured such that during use a maximum pushing force which buffers these products is obtained (i.e., the pushing force is maximized).

With the above-described measures, it is achieved in an effective manner that drifting is avoided for a great many situations. Suitably, such conveyors can be used for collecting and buffering a variety of products, in particular packaging elements such as boxes, more particularly boxes that do not all have exactly the same shape but exhibit small mutual deviations.

As has been explained in more detail hereinabove, the maximum pushing force mentioned is, in particular, a maximized pushing force (i.e., the pushing force can, during use, rise from an initial value—for instance with the roller conveyor unloaded—to a limiting value and not exceed that limiting value). Further, to one skilled in the art it will be clear that products buffered on the rollers (against the end stop) contact each other for instance by way of mutually facing sides or edges, to pass on pushing force mutually, in the direction of an end stop mentioned, whereby the end stop exerts a reactive force on a series of buffered products for the purpose of buffering. Such reactive force of the end stop on a series of products buffered against it (at least, on a most forward product of such series of products, that abuts against the stop) is thus maximized also.

More detailed, extra advantageous elaborations of the invention are described in the dependent claims.

BRIEF DESCRIPTION OF THE FIGURES

Hereinbelow, on the basis of a drawing, the details of the present invention will be described.

More particularly, the drawing comprises FIGS. 1, 2 and 3, wherein FIG. 1 shows a side view of a cross section through a conveyor system according to a first exemplary embodiment of the present invention, in which a single product is buffered, wherein FIG. 2 shows a same side view of the cross section according to FIG. 1, where several products are buffered, and wherein

DETAILED DESCRIPTION

In these FIGURES identical numerals and letters refer to the same parts and features.

The drawings show non-limiting examples of a conveyor system (or conveyor) in a frame 2 with a substantially plane conveying surface composed by rollers 3 for conveying products P in a conveying direction T to an end station with end stop 8. The system can for instance comprise a roller conveyor 1.

Preferably, the frame 2 comprises an edge part with roller shaft slots 5 each with a roller shaft slot lower end (slot bottom), with roller shafts 4 being received displaceably in the roller shaft slots 5. Each of the slots 5 is for instance a vertical slot and/or is designed to guide a respective roller shaft 5 only in vertical direction. As follows from the drawing, the slots 5 can for instance comprise open upper ends, which is advantageous with a view to roller replacement and/or maintenance.

The roller shafts 4 are received in respective slots 5 of the frame 2 in a manner displaceable in for instance vertical direction, in particular from an initial position (shown in FIG. 1) downwards towards the slot lower ends (to a second position) and vice versa. A downward (second) position of the roller shafts 4 (in which these shafts, in particular, contact the slot lower ends/bottoms) is shown in FIG. 2. Thus the roller shaft slots 5 can form limitations (stops), via the respective slot lower ends, for the downward displacement of the roller shafts 4. Preferably, spring means and/or lever means are provided to counteract a vertical displacement of the roller shafts 4 in the respective slots, which is discussed in the exemplary embodiments below.

The conveyor system further comprises at least one beam 6 (also called "roller shaft beam") with a drive belt 7 arranged against the rollers 3 for rotating the rollers 3 to thereby convey the products P. In particular, the rollers 3 are supported or carried by the drive belt when the rollers 3 are in respective initial positions. The configuration is in particular such that (during use), upon a product P reaching the end stop 8 or upon a product P reaching a preceding arrived product P, the drive belt 7 mentioned slips under the rollers 3 under these arrived products P (with the respective rollers 3 preferably standing still and then exerting no propulsion force on the last-mentioned products P anymore). According to an extra advantageous elaboration, the conveyor system is so configured that a maximum pushing force (i.e., propulsion force) which buffers these products P is obtained, at least, a maximized pushing force. According to a further elaboration, with at least one connecting element (that is, one or more connecting means, coupling means and/or supporting means) between or of said beam 6, the frame 2 and/or the rollers 3, a maximum pushing force (i.e., propulsion force) which buffers these products P is obtained, at least, a maximized pushing force.

According to a further elaboration, a (vertical, downward) displacement of the roller shafts 4—from the initial position—during use can in particular lead to an increasing engagement force between the respective rollers 3 and the drive belt 7 extending under them. By maximizing such vertical displacement, the engagement force can be maximized.

Following further from the drawings is a method, for instance a use of a conveyor system as mentioned. With advantage, the method comprises at least the following steps:

conveying products P on the rotary rollers 3 to the end position, rotating the rollers 3 with a drive belt arranged against the rollers 3, wherein for the rollers 3 under the buffered products, standstill between the rollers 3 and the products (in particular standstill of the rollers 3 themselves), and slip between these rollers 3 (preferably standing still) and the drive belt 7, is obtained, and obtaining a maximum pushing force in buffering of these products P at the end station.

Figure 1:
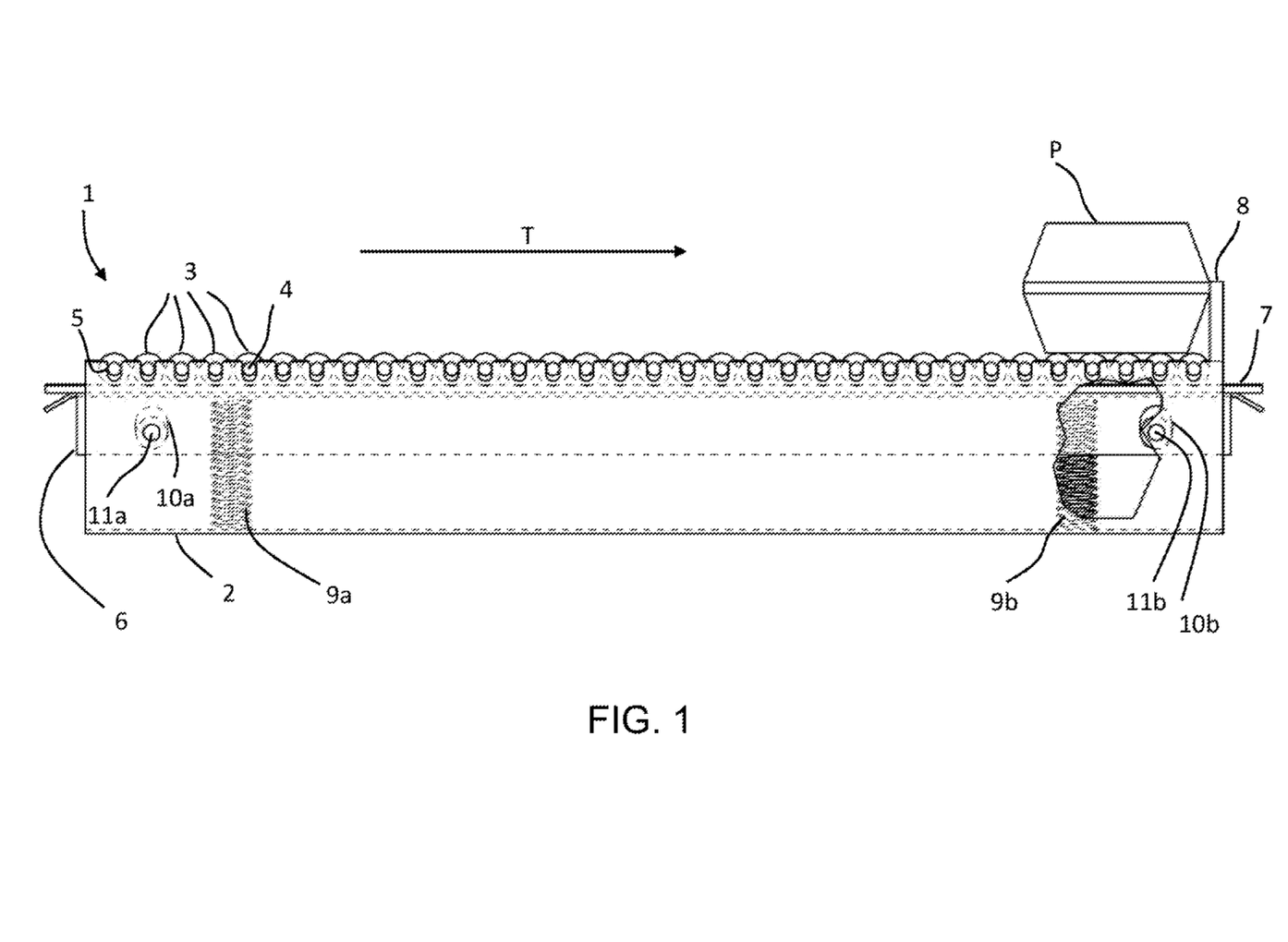
Figure 2:
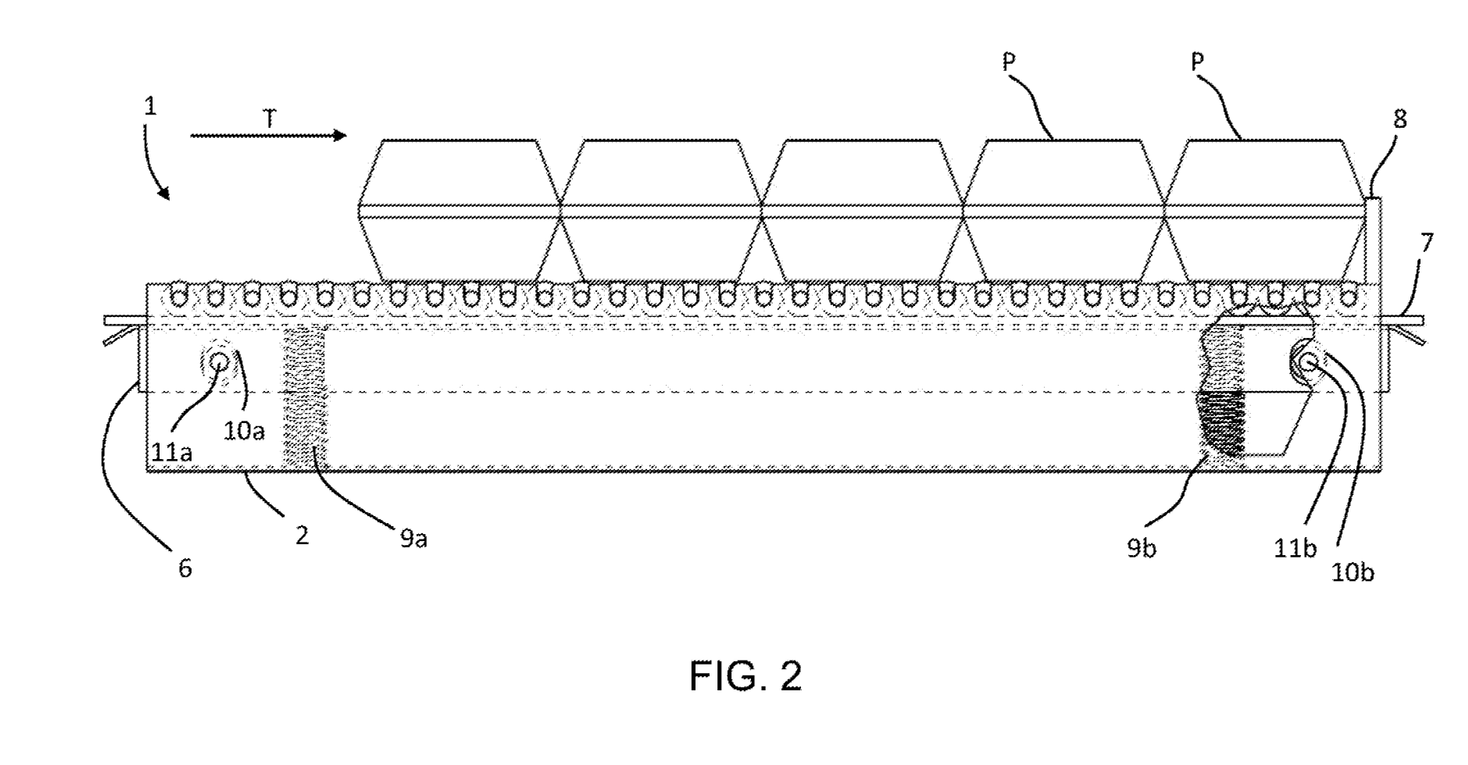

In FIG. 1 there is shown, in particular, a side view of a cross section through a conveyor system 1 according to a first embodiment of the present invention. It comprises a frame 2, and a beam 6 connected or coupled thereto with connecting means (in particular one or more connecting elements or coupling means). Provided in an edge part of the frame 2 are for instance substantially vertically extending roller shaft slots 5 with roller shaft slot lower ends, in which roller shaft slots 5 roller shafts 4 of rollers 3 of this system 1 are displaceably received. Thus, the roller shaft slots 5 function as supporting means for the roller shafts 4 (and respective rollers). As can be seen in FIG. 1, the rollers rest on a drive belt 7 which is part of and is arranged on the beam 6. Generally, such a drive belt 7 is endless and is guided in the usual manner over end pulleys of which, for instance, one is driven, for instance with an electric motor.

Further, conveying direction T is indicated, in which the products P, egg boxes in the instance shown, are displaced when the rollers start to rotate as a result of friction between the rollers 3 and the drive belt 7.

At the end of the conveyance path, an end stop 8 is represented. Its purpose is to retain the products P supplied in conveying direction T. Generally, after supply of a few of these products P, further processing steps will take place. For example, a group of for instance three boxes P moved against one another is picked up and placed in a large packing box, either manually or automatically, for instance with a robot. Since FIG. 1 only gives a view from a single direction, there may be several rows, in the FIGURE behind each other, which may then be picked up jointly.

The materials (in particular of the rollers 3 and the belt 7) have been chosen such that upon driving of the belt 7 the rollers 3 under this egg box P which has been moved on against the end stop 8 are at a standstill, while the belt 7 slips under these rollers. In other words: the configuration is such that rollers 3 which are under a (buffered) product P standing still, stand still too, in particular in each position of the roller shafts 4 of those rollers 3 in the respective slots 5 (hence also in the second, extreme, position when the roller shafts 4 sit on the lower ends of the slots). As mentioned earlier, a pushing force/thrust exerted by the belt 7 on the rollers 3 is preferably maximized, in order that the standstill of the rollers 3 can be ensured, in particular when the rollers 3 are in the second positions.

In FIG. 2 a same view is shown, now for the instance where five boxes have been moved against the end stop 8. In this FIG. 2, there is represented in detail how, at this load, that is, the five egg boxes P, the roller shafts 4 have come down farther into the roller shaft slots 5 towards the lower ends (bottoms) thereof. As mentioned hereinabove for the single egg box P against the end stop 8, it holds also for this row of five boxes, that the rollers 3 that are under the five boxes do not rotate and the drive belt 7 slips under the rollers 3.

In FIGS. 1 and 2, for two working situations, connecting means according to a first embodiment of the invention are represented. In particular, the connecting means comprise at least two parts, viz., a system of a number of (for example two) springs 9a, 9b and, represented here, a number of (for example two) pin-slot connections 10, 11. The springs 9a, 9b support the beam 6 and press against the frame 2 by means of the two pin-slot connections (which are for instance formed by two beam slots 10a, 10b (for example, passages) with beam slot ends provided in beam 6, and two associated beam pins 11a, b arranged on and projecting from the frame 2.

More particularly, because of this combination of pins 11 and slots 10, through the pressing-on by the springs 9 a bias (pre-tension) will be generated so that upon supply of the first products P, the pins 11 remain pressed against the beam slot ends of the slots 10. In general, rigid springs 9 are used.

To one skilled in the art it will be clear that at least a single spring 9 and along with it a pin-slot connection 10, 11 provide an extra advantageous elaboration of the invention.

In the following, briefly, for a few successive working situations, the effect of the above-mentioned combination of measures will be explained, whereby, for an increasing pushing force, the present invention provides for the obtaining of a situation where this pushing force becomes maximal (in particular by use of maximization of a propulsion force to be exerted by the rollers on the products P).

As indicated in FIG. 1, upon supply of a single product P, the roller shafts 4 of the rollers 3 are at the top in the roller shaft slots 5 (at least, in respective initial positions), which slots 5 are provided in an edge part of the frame 2. This situation will remain unchanged for situations from the very outset when no product P is on the rollers 3 yet, until supply of a certain number of products P which then jointly constitute at least a well-defined weight. This well-defined weight corresponds to the pressing force with which the springs 9 which support the beam 6, also press this beam 6 by way of the slots against the pins 11 and thereby provide a bias trajectory. At that weight, this pressing force or bias of the springs 9 is compensated or equaled and the pins 11 will come off the slots 10.

It is noted that the above-mentioned joint weight generally does not correspond exactly to the bias mentioned, because supply of products P with such a conveyor simply implies that different product streams will be processed, each with respective different types of products P (with other individual weights), but also that within a product stream of the same products P small mutual differences between the products P can exist. This last is certainly the case with egg boxes in which eggs of varying weights will be packaged and transported.

More particularly, it is noted that when the above-mentioned bias is first exceeded, the pins 11 come off the slots 10. This will involve, given the settings chosen, more particularly given the choice of the springs 9 which are rigid as mentioned above, a small displacement distance (pin detachment distance), for example a few mm. Over this same distance the roller shafts 4 will come down or be moved down in the roller shaft slots 5. With a next product P, the small or minor distance to the lower ends of the roller shaft slots will be further bridged, the roller shafts 4 then resting on the lower ends of the roller shaft slots 5.

The two above-explained situations, i.e., the pins 11 coming off the slots 10, and the roller shafts 4 coming wholly down the roller shaft slots 5, are determinative of the course of the pushing force/propulsion force (on the rollers) supplied by the drive belt 7.

To one skilled in the art, it will be clear that this pushing force is provided by the frictional force which in turn is determined by reaction to the weight force and the dependence on the coefficient of friction. More particularly, it holds that in the trajectory in which the bias will decrease and is equaled, the pushing force will increase accordingly. As soon as the roller shafts 4 run against the lower ends of the roller shaft slots 5, the pushing force will not increase any further, in other words, reach a maximum value. This result means that settings can be chosen such that drifting of products P is avoided altogether. Moreover, choices and combinations can be made for parts of the roller shaft surfaces, for roller shaft diameters, and for conveying surface inclinations for which corresponding components of the weight forces have to be taken into account, which choices and combinations make further suitable conveyance situations possible. The conveying surface shown extends in substantially horizontal direction, but may also extend (at least partly) along an inclination.

A further advantage of the above-described situation resides in the small or minor distances over which the roller shafts 4 can come down in the associated slots 5 (from an initial position) so that the conveying surface will have practically the same height position for all working situations. As follows from the drawing, this distance is for instance less than a diameter (i.e., outer circumference) of the respective rollers 3, in particular less than a half diameter of the rollers 3, and for instance less than a diameter of the roller shafts 4 themselves.

It is noted that a maximum pushing force is also achieved when the pin-slot connection with pins 11 and slots 10 is not applied (the pin-slot connections 10, 11 are therefore not essential). However, since in that case no bias trajectory to reach the well-defined weight applies, the springs 9 will be compressed over a considerably greater distance before the above-mentioned lower ends of the roller shaft slots 5 are reached. This means that the conveying surface of the conveyor will accordingly reach the position at which the maximum pushing force is obtained at a different height.

In the following, a further exemplary embodiment will be discussed where coupling means are used whereby a part of the weight is compensated in a different manner than with a system of springs.

Figure 3:
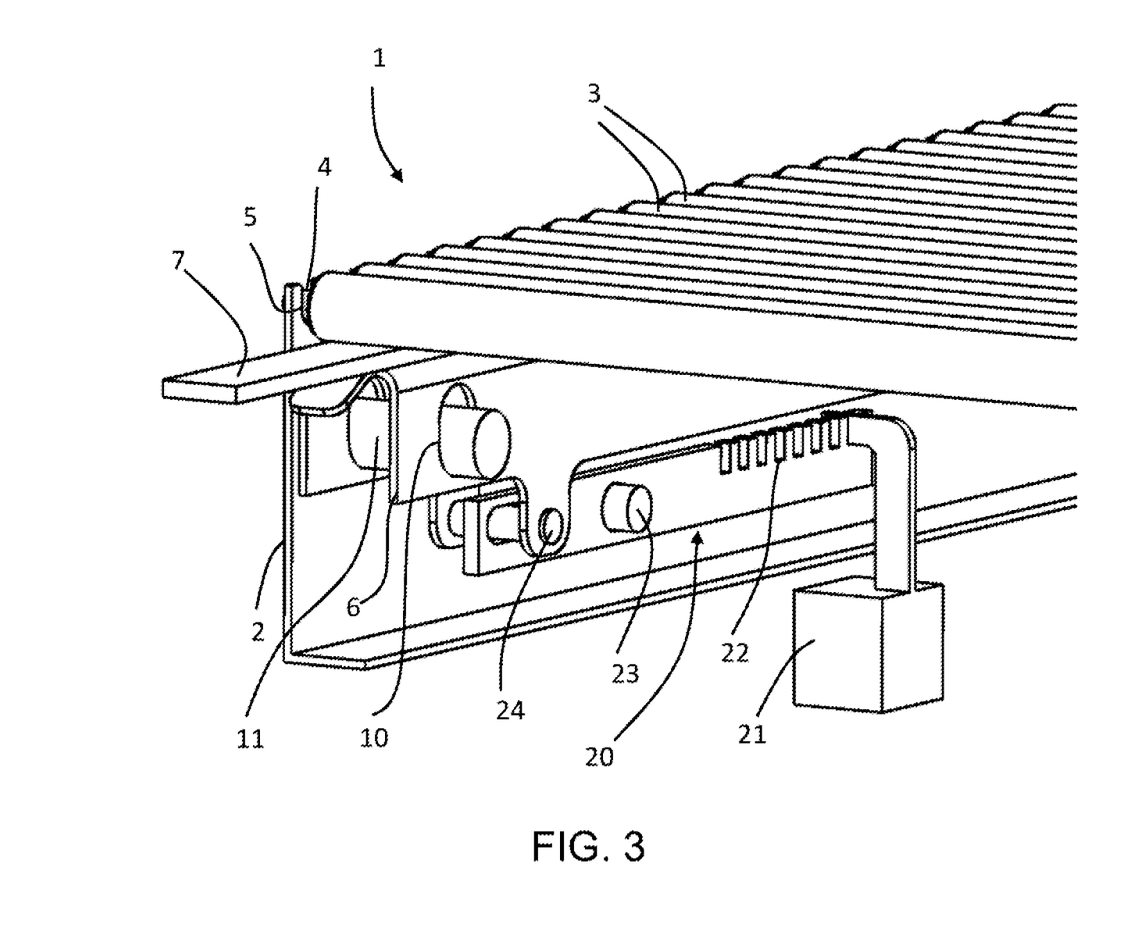
FIG. 3 shows a further exemplary embodiment of the invention.

In FIG. 3 there is shown in a stereometric view a part of a further exemplary embodiment of the invention, with conveyor system 1, frame 2, rollers 3, and roller shaft 4 for a single roller in this view, movably arranged in a roller shaft slot 5 in an upper edge of the frame 2. A beam pin 11, connected with and projecting from the frame 2, is movably received in a beam slot 10 (for example a passage) provided in a beam 6. The rollers 3 are driven in a known manner with a drive belt 7, arranged on the beam 6, in the same manner as indicated for FIGS. 1 and 2.

Functioning as connecting elements/coupling means between the frame 2 and the beam 6 is, for instance, a lever system 20, with counterweight 21, a setting slot 22 for placing the counterweight 21 in an arm of this lever system, a (lever) pivot 23 which is connected with the frame 2, and for example a connecting pin 24 which is for instance connected with the beam 6.

In the same way as explained for the first exemplary embodiment, the rollers 3 will by way of the roller shafts 4 come down in the roller shaft slots 5, whereby a maximum for the pushing force, set with the counterweight 21, is reached, and the drive belt 7 will again slip under the rollers 3 when an end stop (not shown) has been reached.

Equaling of the leverage, which has its effect via the lever 20 on the (in FIG. 3) left-hand side of the (lever) pivot 23 at the location of the connecting pin 24, takes place upon supply of a stream of products P in a manner similar to that indicated for the springs 9 in FIGS. 1 and 2. In this exemplary embodiment too, the roller shafts 4 will at some point in time descend in the roller shaft slots 5, whereby the maximum pushing force is reached.

To one skilled in the art, it will be clear that in addition to the exemplary embodiments and the possible combinations further variants on the above-described measures are possible.

A further variant concerns reversal of the positions of the optional pins 11 and slots 10, namely, connecting the pins 11 with the beam 6 and providing the slots in the frame 2. With this construction too, the above explained maximum pushing force can be obtained, with the pins 11 in this variant application being pressed against an upper end of the slots 10.

In yet a further variant, further implementations of drive belts 7 may be used, with the roller shafts 4 being driven either on a single side or on both sides. This enables varying of the driving power of the drive belt 7, which is directly related to the frictional force, and hence to the pushing force.

To one skilled in the art, it will be clear that various modifications and variants of the embodiments are possible within the scope of the invention, as defined in the appended claims.

| KEY TO REFERENCE NUMERALS | |
|---|---|
| 1 | roller conveyor |
| 2 | frame |
| 3 | rollers |
| 4 | roller shaft |
| 5 | roller shaft slot |
| 6 | beam |
| 7 | drive belt |
| 8 | end stop |
| 9 a, b | beam support springs |
| 10 a, b | beam slots |
| 11 a, b | beam pins |
| 20 | lever |
| 21 | counterweight |
| 22 | setting slot |
| 23 | pivot |
| 24 | connecting pin |

The invention claimed is:
1. A conveyor system, comprising:
a frame with a substantially plane conveying surface composed by rollers for conveying products (P) in a conveying direction to an end station with end stop,
wherein the frame comprises an edge part with roller shaft slots each with a roller shaft slot lower end, in which roller shafts are displaceably received,
wherein the conveyor system further comprises a beam with a drive belt arranged against the rollers for rotating the rollers to thereby convey the products (P) such that upon a product (P) reaching the end stop or upon a product (P) reaching a preceding arrived product (P) said drive belt slips under the rollers under these arrived products (P); and
wherein the conveyor system is configured such that a pushing force is generated which buffers these products (P),
wherein the roller shafts are received in respective slots of the frame in a manner displaceable in vertical direction from an initial position downwardly towards the slot lower ends and vice versa such that the roller shaft slots form limitations for the downward displacement of the roller shafts and define a second position of the roller shafts, with a downward displacement of the roller shafts during use leading to an increasing engagement force between the respective rollers and the drive belt extending thereunder; and wherein the roller shafts are displaceable from an initial position downwardly to a second position, over a distance that is less than a diameter of the respective rollers; and blocking means to block an upwardly directed movement of roller shafts which are in said initial position, the blocking means comprising pin-slot connections to couple the frame and said beam with each other in a vertically displaceable manner.

2. The conveyor system according to claim 1, wherein spring means and/or lever means are provided to counteract an above-mentioned vertical displacement of the roller shafts in the respective slots.

3. The conveyor system according to claim 1, wherein the conveyor system comprises at least a single spring which supports the beam on the frame, which spring is under a bias, wherein (during use) upon supply of products (P) these are moved against the stop, the roller shafts are displaced downwardly in the roller shaft slots and at a well-defined weight of these products (P) the roller shafts rest on said lower ends in a second position, wherein upon said downward displacement of the roller shafts, a pushing force is built up with the end stop and upon the roller shaft slot lower ends being reached the pushing force reaches a maximum value.

4. The conveyor system according to claim 1, wherein the rollers rest on the drive belt, wherein the drive belt is arranged on the beam.

5. A conveyor system, comprising:
a frame with a substantially plane conveying surface composed by rollers for conveying products (P) in a conveying direction to an end station with end stop;
wherein the frame comprises an edge part with roller shaft slots each with a roller shaft slot lower end, in which roller shafts are displaceably received;
wherein the conveyor system further comprises a beam with a drive belt arranged against the rollers for rotating the rollers to thereby convey the products (P) such that upon a product (P) reaching the end stop or upon a product (P) reaching a preceding arrived product (P) said drive belt slips under the rollers under these arrived products (P); and
wherein the conveyor system is configured such that a pushing force is generated which buffers these products (P),
at least a single spring, which supports the beam on the frame the spring being under a bias, and
at least one pin-slot connection,
wherein in an unloaded situation of the rollers said spring presses the beam in the pin-slot connection the pin with a well-defined pressing force against a slot lower end, and wherein the roller shafts are at a distance from the lower ends
wherein upon increasing loading of the rollers upon supply of products (P), to a correspondingly increasing extent the pressing force is decreased until the pin comes off the slot lower end whereafter upon further supply of products the roller shafts come down to the lower ends,
wherein upon said increasing loading, the pushing force increases and upon the roller shafts reaching the slot lower ends a maximum pushing force is generated.

6. The conveyor system according to claim 5, wherein a said pin-slot connection comprises;

at least a single beam pin attached to and projecting from the frame, and with, correspondingly, at least a single beam slot with a slot lower end in the beam; or
at least a single pin attached to and projecting from the beam, and with, correspondingly, at least a single slot with a slot lower end in the frame.

7. A conveyor system, comprising:
a frame with a substantially plane conveying surface composed by rollers for conveying products (P) in a conveying direction to an end station with end stop; and
a lever system with counterweight, wherein the frame comprises an edge part with roller shaft slots each with a roller shaft slot lower end, in which roller shafts are displaceably received;
wherein the conveyor system further comprises a beam with a drive belt arranged against the rollers for rotating the rollers to thereby convey the products (P) such that upon a product (P) reaching the end stop or upon a product (P) reaching a preceding arrived product (P) said drive belt slips under the rollers under these arrived products and
wherein the conveyor system is configured such that a pushing force is generated which buffers these products (P).

8. The conveyor system according to claim 7, wherein the lever system is a system;
including a pivot, which is connected with the frame, and including at least one pin-slot connection,
wherein in unloaded situation of the rollers, said lever with a leverage presses up the beam, by pressing the pin with a well-defined leverage against a slot lower end such that the roller shafts are at a relatively small distance from the slot lower ends,
wherein upon increasing loading of the rollers upon supply of products (P), to a correspondingly increasing extent the leverage is decreased until the pin comes off the slot lower end whereafter upon further supply of products (P) the roller shafts come down to the slot lower ends, and
wherein upon said increasing loading the pushing force increases and upon the roller shafts reaching the slot lower ends a maximum pushing force is generated.

9. The conveyor system according to claim 8, wherein a said pin-slot connection comprises:
at least a single beam pin attached to and projecting from the frame, and with, correspondingly, at least a single beam slot with a slot lower end in the beam; or
at least a single pin attached to and projecting from the beam, and with, correspondingly, at least a single slot with a slot lower end in the frame.

10. A conveyor system, comprising:
a frame with a substantially plane conveying surface composed by rollers for conveying products (P) in a conveying direction to an end station with end stop;
wherein the frame comprises an edge part with roller shaft slots each with a roller shaft slot lower end, in which roller shafts are displaceably received;
wherein the conveyor system further comprises a beam in direct contact with a drive belt, the drive belt being arranged against the rollers for rotating the rollers to thereby convey the products (P) such that upon a product (P) reaching the end stop or upon a product (P) reaching a preceding arrived product (P) said drive belt slips under the rollers under these arrived products (P); and wherein the conveyor system is configured such that a pushing force is generated which buffers these products (P).

* * * * *